US010984365B2

(12) United States Patent
Fang

(10) Patent No.: US 10,984,365 B2
(45) Date of Patent: Apr. 20, 2021

(54) INDUSTRY CLASSIFICATION

(71) Applicant: Microsoft Technology Licensing, LLC, Redmond, WA (US)

(72) Inventor: Zhanpeng Fang, Zhongshan (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 768 days.

(21) Appl. No.: 15/365,723

(22) Filed: Nov. 30, 2016

(65) Prior Publication Data

US 2017/0154295 A1 Jun. 1, 2017

Related U.S. Application Data

(60) Provisional application No. 62/261,234, filed on Nov. 30, 2015.

(51) Int. Cl.
*G06Q 10/06* (2012.01)
*G06Q 30/02* (2012.01)
*G06Q 50/00* (2012.01)
*G06Q 10/10* (2012.01)

(52) U.S. Cl.
CPC ..... *G06Q 10/06398* (2013.01); *G06Q 10/105* (2013.01); *G06Q 30/0269* (2013.01); *G06Q 50/01* (2013.01)

(58) Field of Classification Search
CPC .. G06Q 10/00; G06Q 30/02; G06Q 10/06398; G06F 16/24568; G06F 16/2453; G06F 16/2454; G06F 16/3329; G06F 15/18
USPC ................................................ 705/7.11–7.42
See application file for complete search history.

(56) References Cited

U.S. PATENT DOCUMENTS

| | | | |
|---|---|---|---|
| 2010/0153289 A1* | 6/2010 | Schneiderman ..... | G06Q 10/105 705/320 |
| 2011/0231329 A1* | 9/2011 | Vianello ................. | G01C 21/20 705/321 |
| 2011/0238591 A1* | 9/2011 | Kerr ....................... | G06Q 10/06 705/321 |
| 2012/0290330 A1* | 11/2012 | Coleman ............... | G06Q 40/00 705/4 |
| 2013/0013345 A1* | 1/2013 | Wallquist ........... | G06Q 10/0635 705/4 |

(Continued)

OTHER PUBLICATIONS

Chenthamarakshan et al., Leveraging social networks for corporate staffing and expert recommendation, Nov. 1, 2009, IBM Journal of Research and Development, vol. 53, Issue: 6, pp. 11:1-11:10 (Year: 2009).*

*Primary Examiner* — Robert D Rines
(74) *Attorney, Agent, or Firm* — Schwegman Lundberg & Woessner, P.A.

(57) ABSTRACT

Techniques for determining a new industry classification for a company are described. An industry classifier can access company data of a company and profile data of an employee of the company. Additionally, a plurality of updated classifications associated with the company can be accessed from an industry taxonomy database. A featurization process can calculate a classification score for each updated classification based on the accessed data. Additionally, the featurization process can determine a new industry classification for the company based on the calculation. Subsequently, a company page updater can update a company page associated with the company by adding the new industry classification to the company page.

17 Claims, 8 Drawing Sheets

(56) References Cited

U.S. PATENT DOCUMENTS

| | | | |
|---|---|---|---|
| 2013/0339337 A1* | 12/2013 | Alkhateeb | G06F 16/951 707/710 |
| 2014/0214706 A1* | 7/2014 | Jung | G06Q 10/1053 705/319 |
| 2014/0280014 A1* | 9/2014 | Komissarchik | G06Q 10/06 707/710 |
| 2016/0132902 A1* | 5/2016 | Davar | G06F 16/22 705/7.29 |
| 2017/0032298 A1* | 2/2017 | de Ghellinck | G06Q 10/0639 |
| 2017/0139984 A1* | 5/2017 | Bordawekar | G06N 20/00 |

* cited by examiner

INDUSTRY CLASSIFICATION

PRIORITY CLAIM

This application claims priority under 35 U.S.C. 119(e) to U.S. Provisional Patent Application Ser. No. 62/261,234, filed Nov. 30, 2015, which is incorporated herein by reference in its entirety.

TECHNICAL FIELD

The subject matter disclosed herein generally relates to data processing for generating a dynamic industry taxonomy database and automatically classify a company based on the generated industry taxonomy. The industry taxonomy can be dynamically generated based on accessed company data from an online social networking service.

BACKGROUND

An online social networking service can maintain information on members, companies, organizations, employees, and employers. The online social network may maintain a company page for a company, which can include office location, number of employees, company description, industry, and other company information. Often, some useful company information may be outdated, missing, or otherwise unavailable to a member of the online social networking service.

BRIEF DESCRIPTION OF THE DRAWINGS

Some embodiments are illustrated by way of example and not limitation in the figures of the accompanying drawings.

DETAILED DESCRIPTION

Example methods and systems are directed to techniques for generating a dynamic industry taxonomy based on accessed data from the online social networking service. Additionally, the present disclosure relates to methods, systems, and computer program products for determining an industry classification of a company based on the accessed company information from company page of the online social networking service or from the company website.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
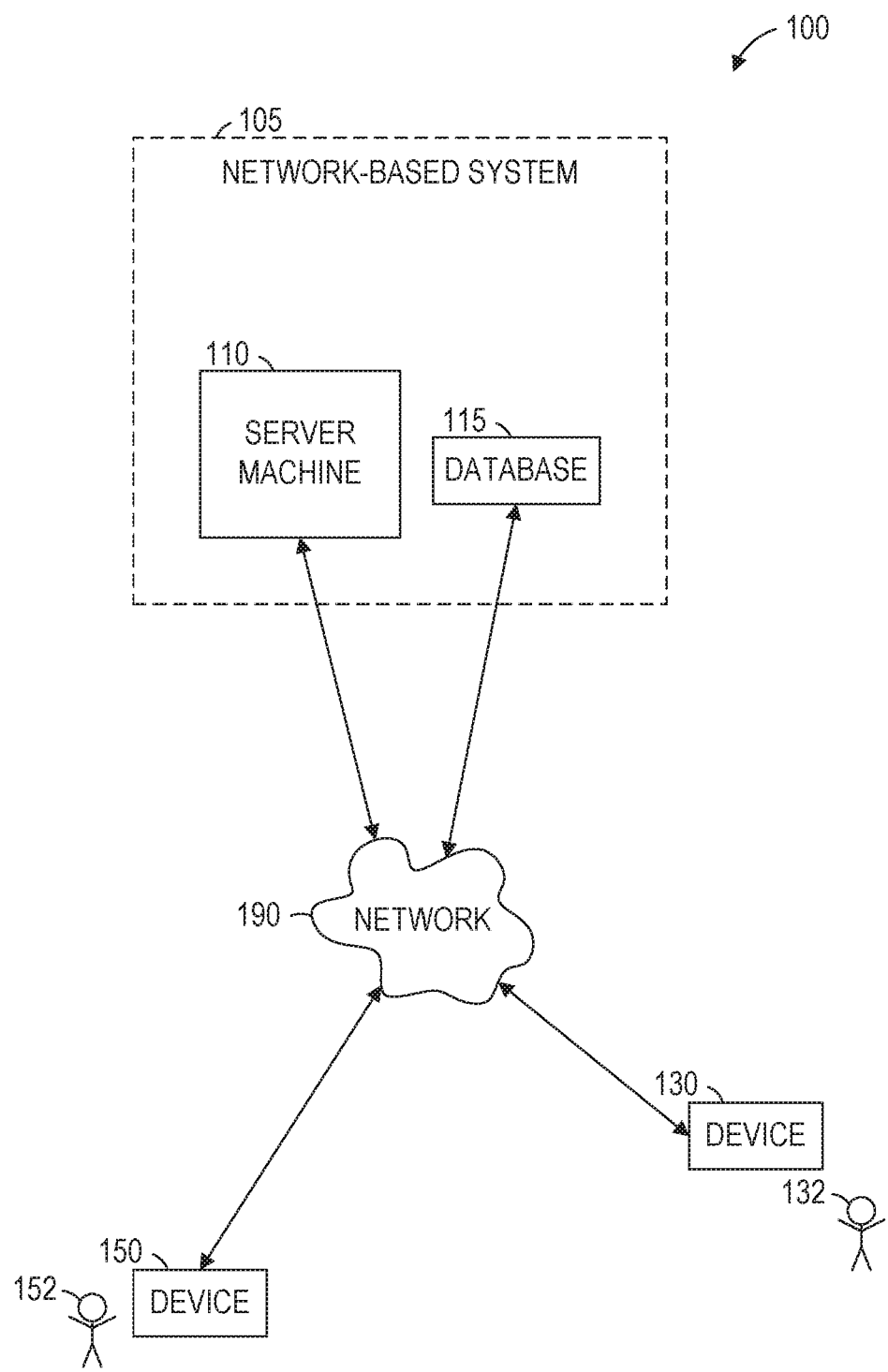
FIG. 1 is a network diagram illustrating a network environment suitable for an online social network, according to some example embodiments.

FIG. 1 is a network diagram illustrating a network environment 100 suitable for an online social network service, according to some example embodiments. The network environment 100 includes a server machine 110, a database 115, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store, but is not limited to storing, member data, company data, education data, social graph data, and member activity data for the online social network service. In some instances, the database 115 can include a plurality of databases (e.g., a first database to store profile data, a second database to store company data, a third database to store updated industry classification). The server machine 110, the first device 130, and the second device 150 may each be implemented in a computer system, in whole or in part, as described below with respect to FIG. 8.

Also shown in FIG. 1 are the users 132 and 152. One or both of the users 132 and 152 may be a human user (e.g., member of the online social network), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

The network 190 may be any network that enables communication between or among machines, databases, and devices e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS)

network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any of the machines, databases, or devices described herein may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIGS. 3 and 4. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices described herein may be combined into a single machine, database, or device, and the functions described herein for any single machine, database, or device may be subdivided among multiple machines, databases, or devices.

Figure 2:
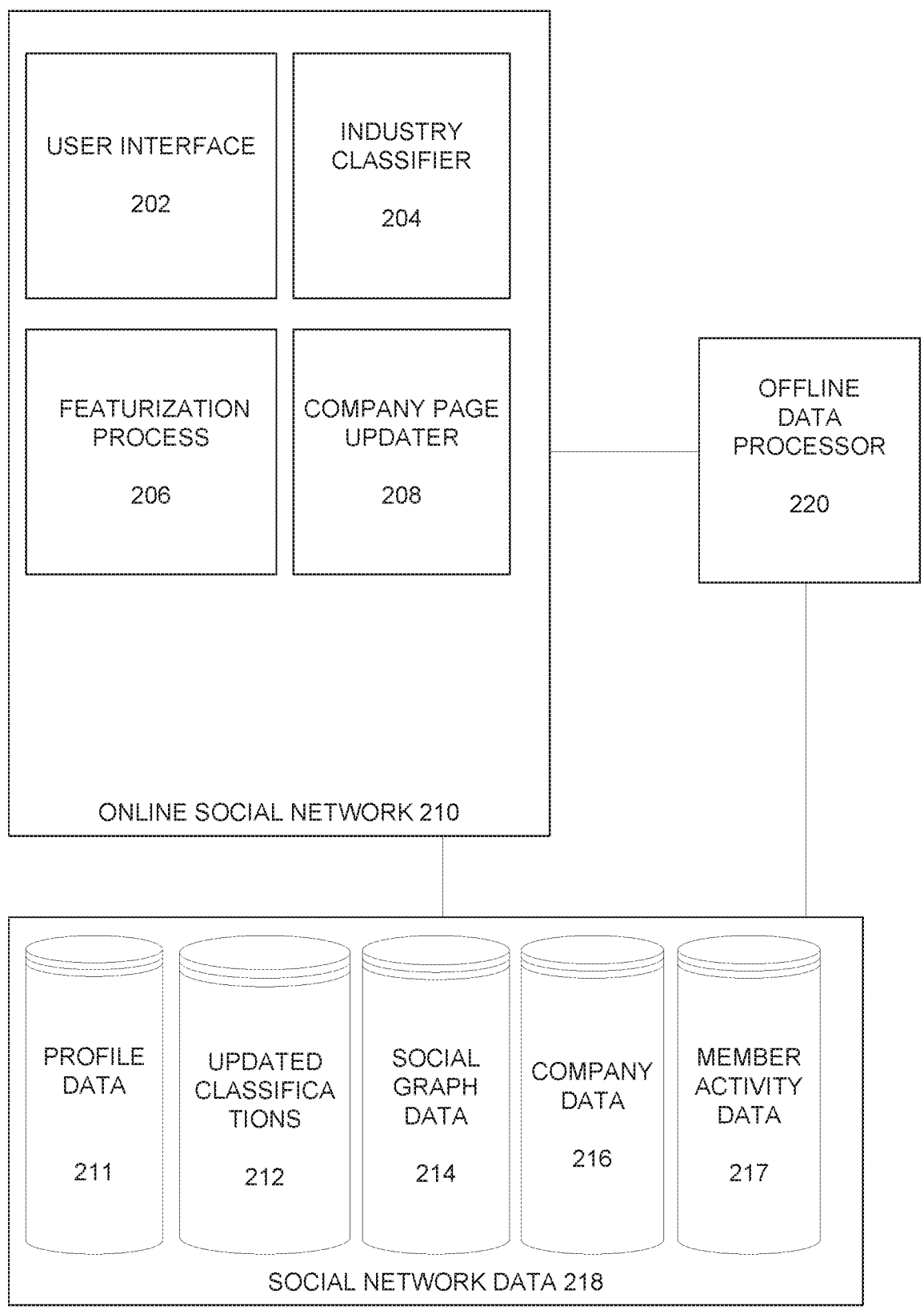
FIG. 2 is a block diagram illustrating various components of an online social network, according to some example embodiments.

FIG. 2 is a block diagram illustrating components of an online social network 210, according to some example embodiments. The online social network 210 is an example of a network-based system 105 of FIG. 1. The online social network 210 can include a user interface 202, an industry classifier 204, a featurization process 206, and a company page updater 208, all configured to communicate with each other (e.g., via a bus, shared memory, or a switch).

Additionally, the online social network 210 can communicate with the database 115 of FIG. 1, such as a database storing social network data 218. The social network data 218 can include profile data 211, updated classifications 212, social graph data 214, company data 216, and member activity data 217.

Using the social network data 218, the industry classifier 204 can generate an updated industry classification. For example, the updated industry classification can better classify newer companies (e.g., start-up) in comparison to the static list of existing industry classification.

Additionally, the featurization process 206 can calculate a classification score for an updated industry classification in association with the company. For example, the classification score can be calculated by comparing the updated or new industry classification with the company data 216 of the company and the profile data 211 of the employee of the company.

In some instances, the comparison by the featurization process 206 is done using Word2Vec techniques. Alternatively, other machine learning techniques can be utilized for the calculation of the classification score. The Word2Vec techniques is a group of related models that are used to produce word embedding. These models are shallow, two-layer neural networks that are trained to reconstruct linguistic contexts of words. For example, Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space. For example, the classification score is based on the proximity of the profile data 211 (e.g., employee keywords, subset of skills, list of job titles) and company data 216 (e.g., company keywords, list of employee industry, list of specialties, third-party keyword) in relation to the updated or industry new classification. Additionally, embedding vectors created using the Word2vec algorithm can many advantages compared to algorithms such as the Latent Semantic Analysis.

Furthermore, the company page updater 208 can determine the industry of a company and update the company page of the company based on the determination. In some instances, some of the processing of the data for the determination can be performed by an offline data processor 220 on a periodic basis (e.g., nightly) in order to return faster search results.

The profile data 211 of a member can a job title, a job description, an industry associated with the member, an employer, a list of skills that the member possesses, and recommendations received by the member. The industry classifier 204 can dynamically generate a new industry taxonomy based on the profile data 211 as described in FIGS. 3 and 4. The profile data 211 that is commonly requested and displayed as part of a member's profile includes educational background (e.g., schools, majors, matriculation and/or graduation dates, etc.), employment history, office location, skills, professional organizations, and so on. In some embodiments, the profile data 211 may include the various skills that each member has indicated he or she possesses. Additionally, the profile data 211 may include skills of a member that have been endorsed by another member.

Figure 7:
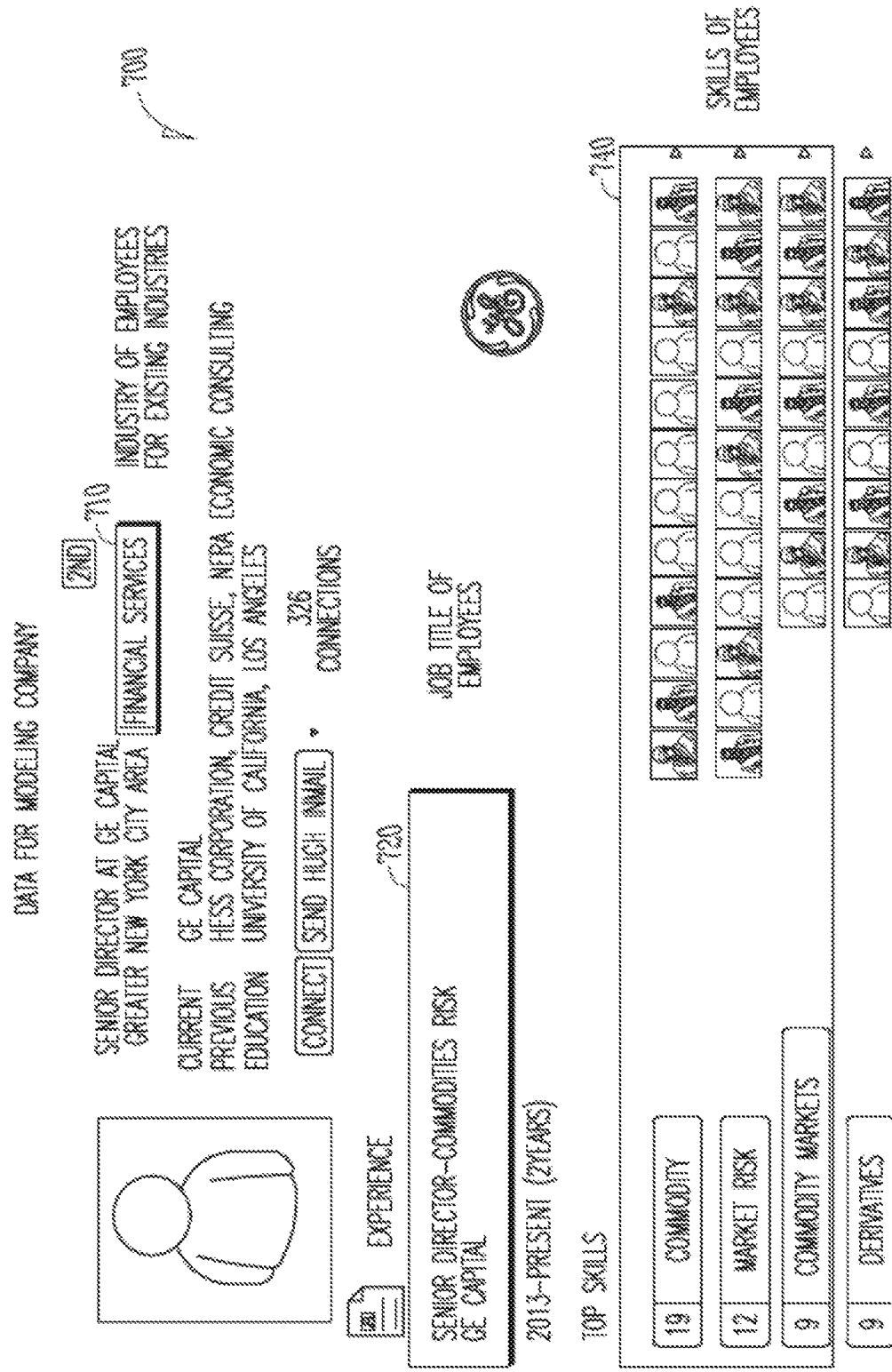
FIG. 7 is an example of accessing industry information from a profile page of an employee of a company for the company's new industry classification, according to some example embodiments.

The profile data 211 can include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on. FIG. 7 illustrates an example of a company page.

For example, the profile data 211 may include the various skills that each member has indicated he or she possesses. Additionally, the profile data 211 may include an endorsement. The endorsement can be a skill for which a member has been endorsed in the profile data 211. Additionally, a recommendation of a member can be received from another member. The recommendation can include a keyword associated with the specific skill. The industry classifier 204 can determine a new industry classification for a company based on a skill endorsement or a recommendation of an employee of the company.

The updated classifications 212 (e.g., updated industry classifications) can new industry classification that have been generated by the industry classifier 204 for newer companies (e.g., start-up, less than 10 years old). The updated classifications associated with an industry of a company can be dynamically generated based on the profile data 211 and the company data 216. For example, the industry classifier 204 can generate a listed of updated industry classifications, which can be verified and approved by an administrator. The updated industry classifications can be more aligned with newer companies. For example, the list of existing industries that are currently listed on company pages may have been generated decades ago for older companies (e.g., more than 10 years old) The techniques for generating and updating the updated classifications 212 are further described in FIGS. 3 and 4.

Additionally, online social network services provide their users with a mechanism for defining their relationships with other people. This digital representation of real-world relationships is frequently referred to as a social graph, which may be stored in the social graph data 214. In some instances, the social graph data 214 can be based on an entity's presence within the online social network service. For example, consistent with some embodiments, a social graph is implemented with a specialized graph data structure in which various entities (e.g., people, companies, schools, government institutions, non-profits, and other organizations) are represented as nodes connected by edges, where the edges have different types representing the various associations and/or relationships between the different entities. Furthermore, the social graph data 214 may be maintained by a third-party social network service. For example, users can indicate a relationship or association with a variety of real-world entities and/or objects. Typically, a user input is captured when a user interacts with a particular graphical user interface element, such as a button, which is generally presented in connection with the particular entity or object and frequently labelled in some meaningful way (e.g., "like," "+1," "follow").

Referring back to FIG. 2, in addition to hosting a vast amount of social graph data 214, many online social network services maintain company data 216 and member activity data 217. The company data 216 can include company information from the company page of the company. The company information can include an office location, an industry, a company description, number of followers, the number of employees, the members that have listed the company as their employer, linked (e.g., employed) at the company a company organization chart, and so on.

The online social network 210 may provide a broad range of other applications and services that allow members the opportunity to share and receive information, often customized to the interests of the members. In some embodiments, members may be able to self-organize into groups, or interest groups, organized around subject matter or a topic of interest. In some embodiments, the online social network 210 may host various job listings providing details of job openings with various organizations.

Figure 6:
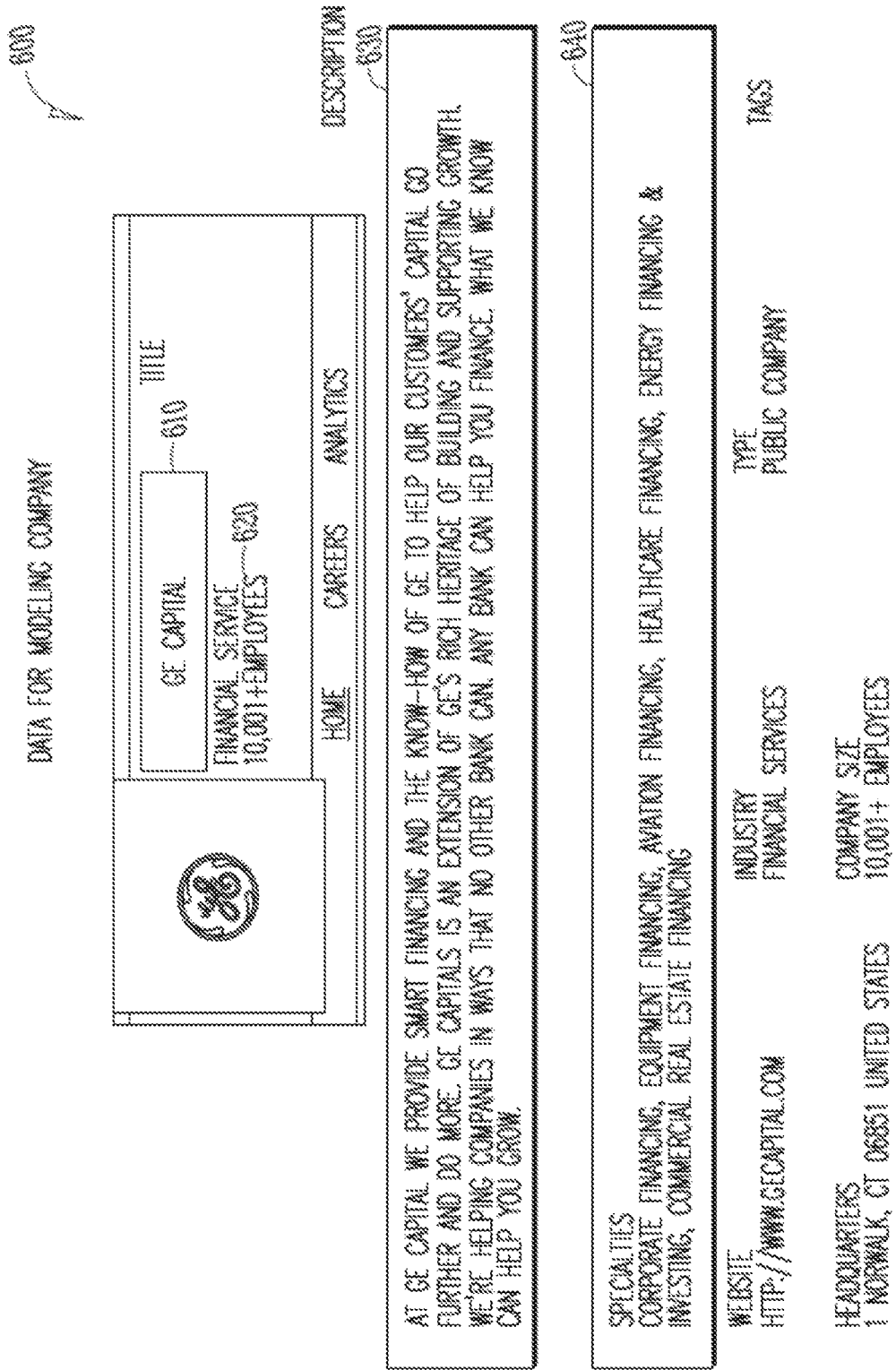
FIG. 6 is an example of accessing industry information from a company page for the company's new industry classification, according to some example embodiments.

The company data 216 includes information listed on a company page of a company. The company data includes an existing industry for the company, a list of specialties that the company possesses, a company title, a company description, and other company related information. The industry classifier 204 can dynamically generate a new industry taxonomy based on the company data 216 as described in FIGS. 3 and 4. FIG. 6 illustrates an example of a company page.

The member activity data 217 can include members' interaction with the various applications, services, and content made available via the online social network 210, and the members' behavior (e.g., content viewed, links selected, etc.) may be used to determine an expert.

Furthermore, the online social network 210 can be configured to process data offline or periodically using the offline data processor 220. In some instances, some or all of the featurization process 206 or model calibration process can be performed by the offline data processor 220. For example, the offline data processor 220 can include Hadoop servers that access the social network data 218 periodically (e.g., on a nightly basis) to rank members according to their influence.

Processing the social network data 218, such as determining the industry classification of a company may be computationally intensive; therefore, due to hardware limitations and to ensure reliable performance of the online social network 210, some determination or calculation by the industry classifier 204 be done offline.

Figure 3:
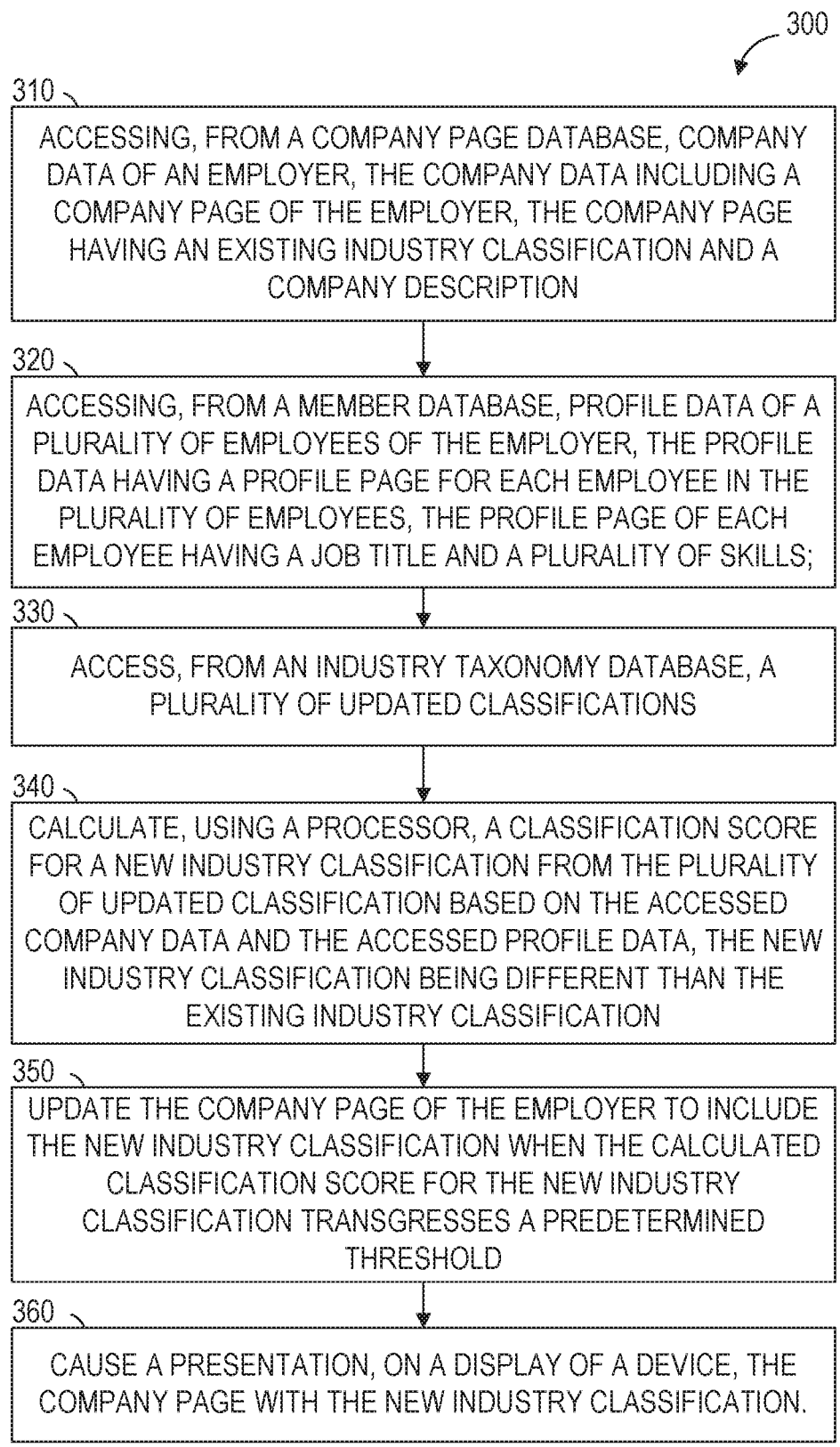
FIG. 3 is a flowchart illustrating operations of the online social network in performing a method for determining a new industry classification for a company, according to some example embodiments.

FIG. 3 is a flowchart illustrating operations of the online social network 210 in performing a method 300 for automatically updating a company page of a company with a new industry classification, according to some example embodiments. Operations in the method 300 may be performed by the network-based system 105, using the job score process 204, the job classifier 208, and the job publisher 208 described above with respect to FIG. 2.

At operation 310, the industry classifier 204 accesses, from a company page database, company data of a company. The company data includes a company page of the company. Additionally, the company page can include an existing industry classification, a company description, and a list of specialties. The company data can be the company data 216 stored in the database 115. Furthermore, the database 115 can be accessed by the server machine 110 using network 190.

At operation 320, the industry classifier 204 accesses, from a member database, profile data of a plurality of employees of the company. The plurality of employees can be the employees of the company that have a profile page on the online social network 210. Additionally, the profile data can include a profile page for each employee in the plurality of employees. The profile page of each employee can include a job title, a job description, an industry associated with the employee and a plurality of skills possessed by the employee. The profile data can be the profile data 211 stored in the database 115. Furthermore, the database 115 can be accessed by the server machine 110 using network 190.

At operation 330, the industry classifier 204 accesses, from an industry taxonomy database, a plurality of updated classifications. The plurality of updated classifications can be different than the existing industry classification accessed at operation 310. The plurality of updated classifications can be the updated classifications 212 stored in the database 115. The database 115 can be accessed by the server machine 110 using network 190.

At operation 340, the featurization process 206 calculates, using a processor, a classification score for a new industry classification from the plurality of updated classification based on the accessed company data accessed at operation 310 and the profile data accessed at operation 320. In some instances, the classification score can be further based on the social graph data 214 and the member activity data 217. Additionally, the new industry classification is different than the existing industry classification that is currently listed on the company page of the company. The techniques for calculating the classification score are further described in FIGS. 4-7. A processor in the server machine 110 can perform the calculation in real-time. In some instances, part of the calculation at operation 340 can be performed offline using the offline data processor 220.

The new industry classification can be selected from the plurality of updated classification. In some instances, a classification score is calculated for each updated classification from the plurality of updated classification. The updated classification with the highest classification score can be selected as the new industry classification being different than the existing industry classification.

In some instances, the classification score for the new industry classification can be calculated by extracting company keywords from the company description in the company page of the company. After the company keywords have been extracted, the featurization process 206 can compare the company keywords with the new industry classification. For example, a Word2Vec technique, as previously described in FIG. 2, can be utilized for the comparison.

In some instances, the classification score for the new industry classification can be calculated by generating a list of job titles by accumulating the job title in the profile page of each employee. Subsequently, the featurization process 206 can compare the list of job titles with the new industry classification. For example, a Word2Vec technique, as previously described in FIG. 2, can be utilized for the comparison.

In some instances, the classification score for the new industry classification can be calculated by selecting a subset of skills from the plurality of skills in the profile pages of the employees. Subsequently, the featurization process 206 can compare the subset of skills with the new industry classification. For example, a Word2Vec technique, as previously described in FIG. 2, can be utilized for the comparison.

In some instances, the profile page of each employee includes an employee industry, which is an industry associated with the employee. The classification score for the new industry classification can calculated by generating a list of employee industry by accumulating the employee industry in the profile page of each employee. Subsequently, the featurization process 206 can compare the list of employee industry with the new industry classification. For example, a Word2Vec technique, as previously described in FIG. 2, can be utilized for the comparison.

In some instances, the featurization process 206 can compare the list of specialties associated with the company with the new industry classification. The list of specialties can be included in the company data accessed at operation 310. For example, a Word2Vec technique, as previously described in FIG. 2, can be utilized for the comparison.

In some instances, the classification score for the new industry classification is calculated by accessing a third-party site associated with the company. The third-party site can be the company website or a wiki page (e.g., Wikipedia) associated with the company. Subsequently, the featurization process 206 can extract third-party keywords from the third-party site and compare the third-party keywords with the new industry classification. For example, a Word2Vec technique, as previously described in FIG. 2, can be utilized for the comparison.

In some instances, the classification score for the new industry classification is calculated by extracting a keyword from the company page of the company. Subsequently, the featurization process 206 can obtain a keyword affinity score for the keyword and the new industry classification. For example, the extracted keyword from the company page can be 'bank' and the new industry classification can be 'investment management.' Additionally, the affinity score for 'bank' and 'investment management' can be high, which can result in the classification score for the new industry classification being above the predetermined threshold.

In some instances, the classification score for the new industry classification is calculated by extracting one or more keyword from the profile page of the employees. The keyword can be extracted from the job description section of the profile page. Subsequently, the featurization process 206 can obtain a keyword affinity score for the keyword and the new industry classification. For example, the extracted keyword from the company page can be 'portfolio manager' and the new industry classification can be 'investment management.' Additionally, the affinity score for 'portfolio' and 'investment management' can be high, which can result in the classification score for the new industry classification being above the predetermined threshold.

According to some embodiments, the calculation of the classification score can be a combination of one or more of the methods listed above. For example, the classification score can be calculated by comparing the company keywords with the new industry classification in addition to comparing the list of job titles with the new industry classification. The classification score can become more accurate as more data (e.g., company keywords, employee keywords, subset of skills, list of job titles, list of employee industry, list of specialties, third-party keyword) with the new industry classification.

At operation 350, the company page updater 208 updates the company page of the employer to include the new industry classification when the calculated classification score for the new industry classification transgresses (e.g., is above) a predetermined threshold. For example, the classification score can range from 0 to 100, and the predetermined threshold can be set by an administrator at 80 or 90. In some instances, the predetermined threshold can be update dynamically based on the number of industry classifications currently listed on the company page of the company. A processor in the server machine 110 can perform the updating in real-time.

In some instances, at operation 360, the user interface 202 can cause a presentation, on a display of a device, the company page with the new industry classification. The device can be the device 130 or the device 150.

In some instances, method 300 can further include the user interface 202 presenting, on a display of a member in the online social network, the new industry classification when the member is viewing the company page of the company.

In some instances, method 300 can further include the company page updater 208 deleting the existing industry classification from the company page. The existing industry classification can be deleted when the new classification is added to the company page at operation 350, or when the classification score is above the predetermined threshold at operation 350.

In some instances, the user interface 202 in method 300 can be further configured to cause a presentation, on a display of a device, of an advertisement for the company based on the new classification. For example, advertisement of the company can be targeted to members associated with the new industry classification.

In some instances, the user interface 202 in method 300 can be further configured to receive a search request associated with the new classification. Subsequently the user interface can cause a presentation, on a display of a device, of a search result based on the search request, the search result including e company.

According to various example embodiments, one or more of the methodologies described herein facilitate the presentation of a new industry classification for a company based on the social network data 218. The new industry classification can be utilized by marketers to effectively run an advertisement campaign, or by a member to effectively search for a company associated with a specific industry.

When these effects are considered in aggregate, one or more of the methodologies described herein may obviate a need for certain human efforts or resources that otherwise would be involved in generating the job score. Furthermore, computing resources used by one or more machines, databases, or devices (e.g., within the network environment 100) may similarly be reduced (e.g., by pre-determining rankings). Examples of such computing resources include processor cycles, network traffic, memory usage, data storage capacity, power consumption, and cooling capacity.

Figure 4:
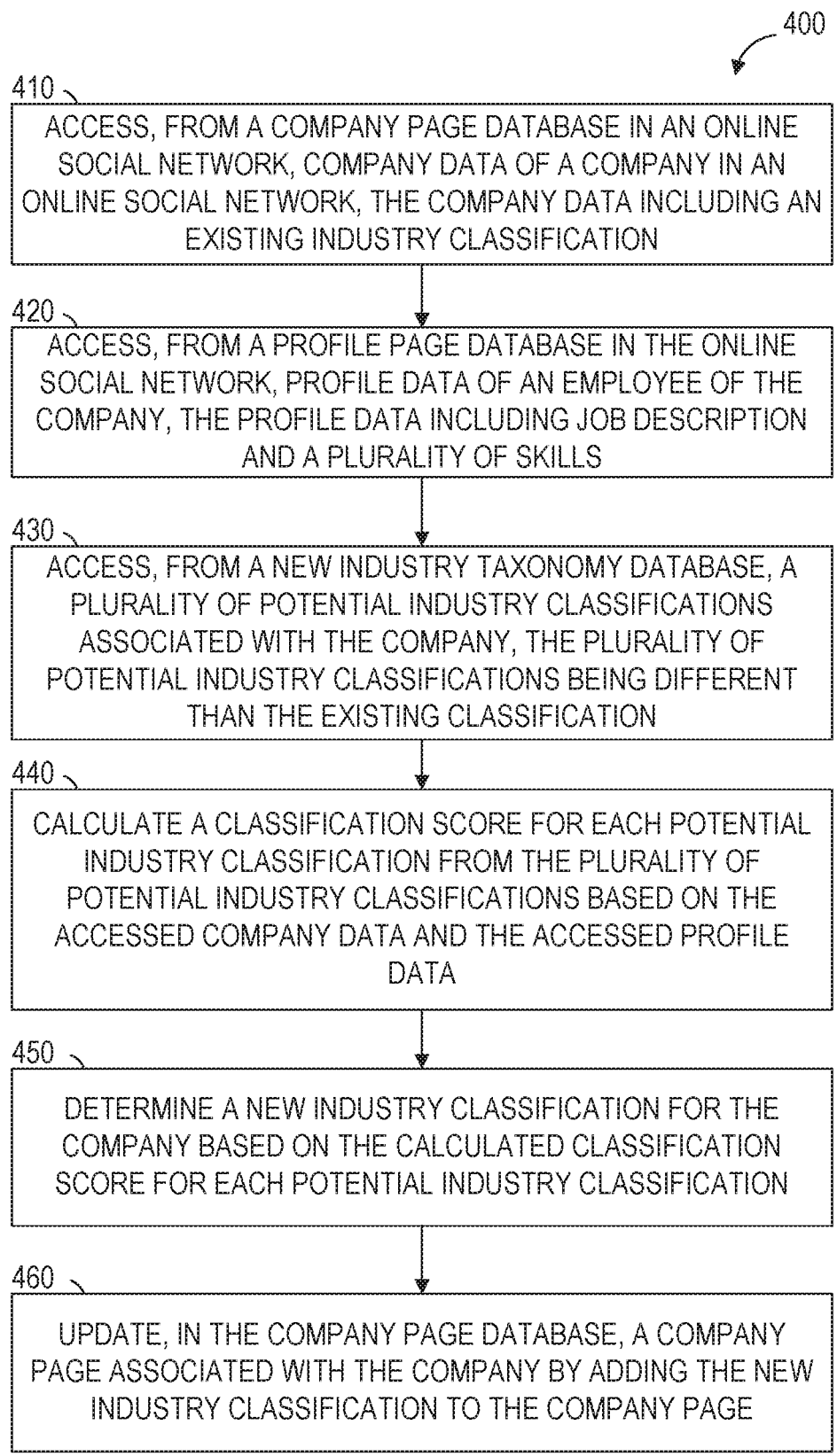
FIG. 4 is a flowchart illustrating operations of the online social network in performing another method for determining a new industry classification for a company, according to some example embodiments.

FIG. 4 is a flowchart illustrating operations of the online social network 210 in performing another method 400 for accessing a new industry taxonomy, and automatically updating a company page of a company with a new industry classification, according to some example embodiments. Operations in the method 400 may be performed by the network-based system 105, using the job score process 204, the job classifier 208, and the job publisher 208 described above with respect to FIG. 2. As shown in FIG. 4, the method 400 includes operations 410, 420, 430, 440, 450, and 460.

At operation 410, the industry classifier 204 can access, from a company page database in an online social network, company data of a company in an online social network. Additionally, the company data can include an existing industry classification. The company database can be company page data 216.

At operation 420, the industry classifier 204 can access, from a profile page database in the online social network, profile data of an employee of the company. The employer can be a member having the company listed as the member's employer in the member's profile page. The profile data can include job description and a plurality of skills. The profile page data can be profile data 211.

At operation 430, the industry classifier 204 can access, from a new industry taxonomy database, a plurality of potential industry classifications associated with the company. The plurality of potential industry classification being different than the existing classification accessed at operation 410. The industry taxonomy database can be industry taxonomy 212.

At operation 440, the featurization process 206 can calculate a classification score for each potential industry classification from the plurality of potential industry classifications based on the accessed company data and accessed profile data. The techniques for calculating the classification score are further described in FIGS. 4-7. In some instances, the classification score can be further based on the social graph data 214 and the member activity data 217. A processor in the server machine 110 can perform the calculation in real-time. In some instances, part of the calculation at operation 430 can be performed offline using the offline data processor 220.

At operation 450, the featurization process 206 can determine a new industry classification for the company based on the calculations at operation 440. For example, a new industry classification can be determined when the classification score for a potential industry classification is above a predetermined threshold. In some instances, the predetermined threshold can be update dynamically using machine-learning techniques. A processor in the server machine 110 can perform the determination in real-time. In some instances, part of the calculation at operation 440 can be performed offline using the offline data processor 220.

At operation 460, the company page updater 208 can update, in the company page database, a company page associated with the company by adding the new industry classification to the company page.

In some instances, method 400 can further include the company page updater 208 presenting, on a display of a member in the online social network, the new industry classification when the member is viewing the company page of the company.

Figure 5:
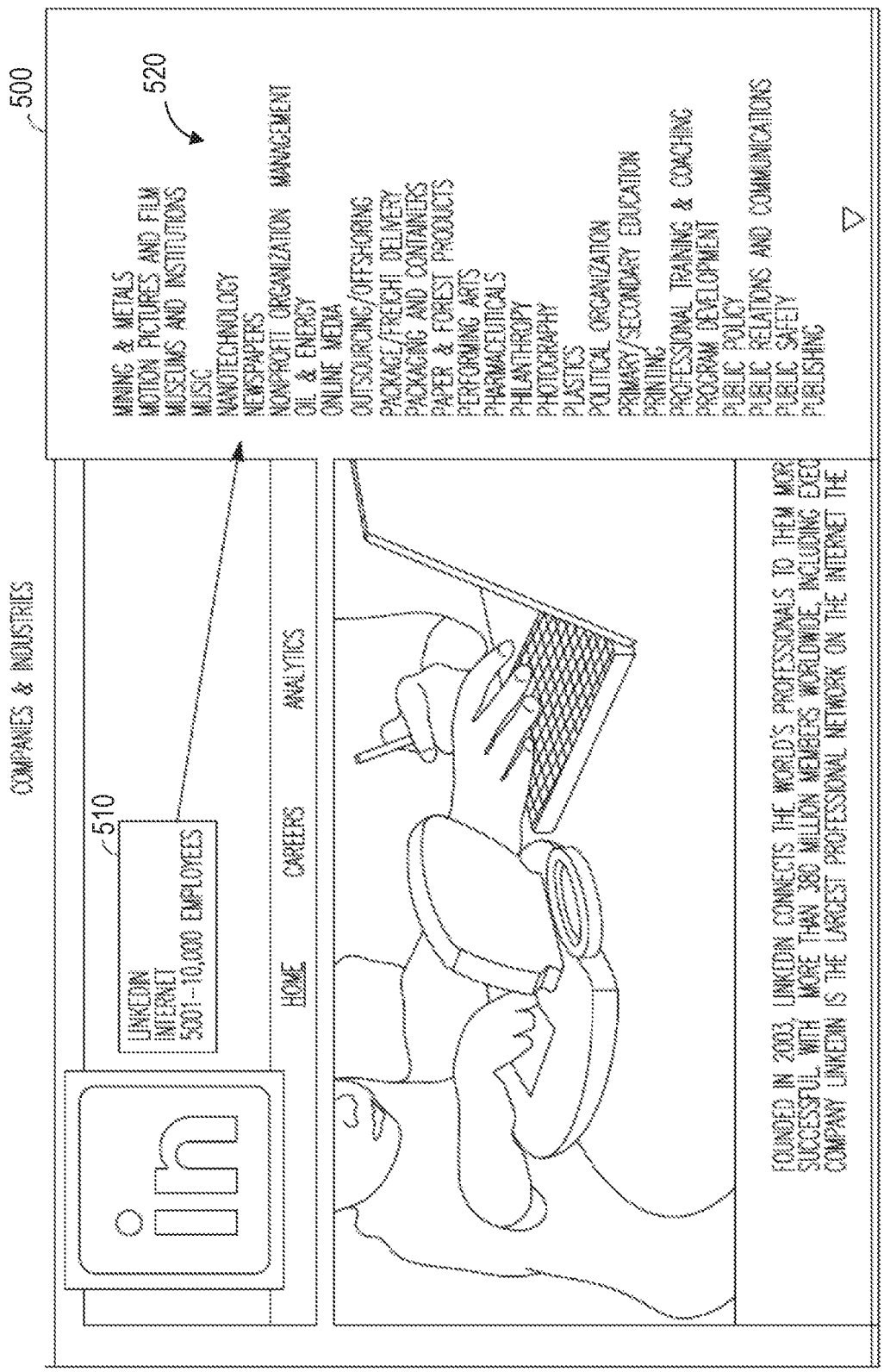
FIG. 5 is an example of a company page associated with a company, according to some example embodiments.

FIG. 5 is a company page associated with a company, according to some example embodiments. The company page 500 of the company lists an existing industry classification 510. The existing industry classification can be from a static industry list 520. For example, the static industry list 520 may not include industry classifications for new industry or new companies. Accordingly, methods 300 and 400 describe techniques to update the existing industry classification 510 to a new industry classification. The new industry classification can be obtained from an industry taxonomy database that stores a plurality of updated classifications.

FIG. 6 is an example of accessing industry information from a company page for the company's new industry classification, according to some example embodiments. For example, the company page 600 can include a title 610, an existing industry classification 620, a company description 630, and a list of specialties 640. As described in methods 300 and 400, the industry classifier 204 and the featurization process 206 can determine a new industry classification for the company based on the information derived from the company description 630 and the list of specialties 640.

FIG. 7 is an example of accessing industry information from a profile page of an employee of a company for the company's new industry classification, according to some example embodiments. For example, the profile page 700 for an employer of a company can include an existing industry for the company 710, a job title 720, and skills of the employee 740. As described in methods 300 and 400, the industry classifier 204 and the featurization process 206 can determine a new industry classification for the company based on the information derived from the job title 720, skills of the employee 740, job description, endorsements, and recommendations.

Example Machine Architecture and Machine-Readable Medium

Figure 8:
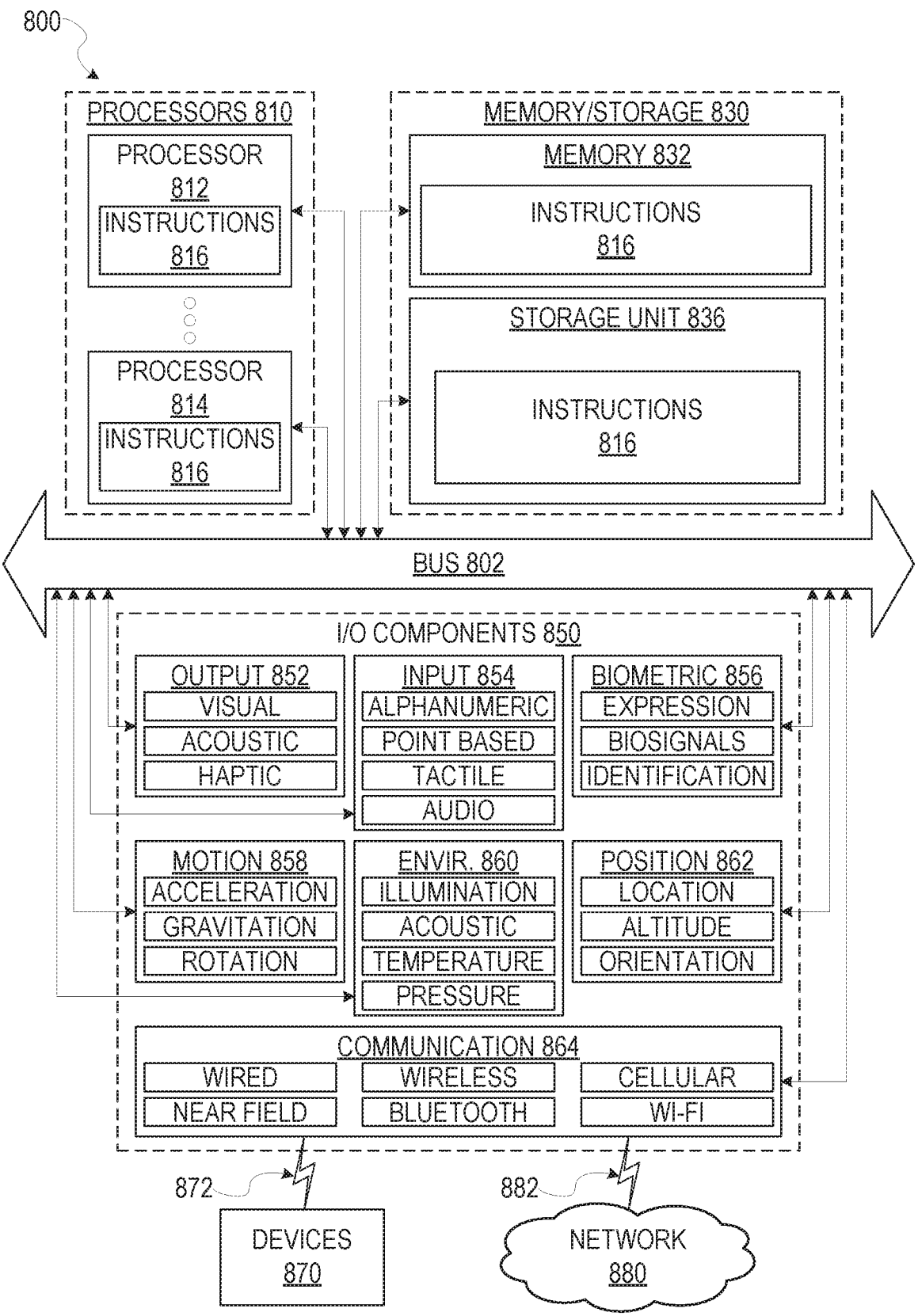
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions may cause the machine to execute the flow diagram of FIG. 8. Additionally, or alternatively, the instructions may implement the industry classifier 204, the featurization process 206, and the company page updates 208, or the search process 208 of FIG. 2, and so forth. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (RDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and 110 components 850, which may be configured to communicate with each other such as via a bus 802. In an example embodiment, the processors 810 (e.g., a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory 832 to store the social network data 218, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   a company profile page database storing company profile data for a plurality of companies, the company profile data for each company including data specifying an existing industry classification for use with a company profile page for the company;
   a member database storing member profile data for employees of the company, the member profile data including data indicating for each employee of the company a job title and a plurality of skills, wherein the plurality of skills are skills possessed by a respective member as indicated by the respective member;
   an industry taxonomy database storing a plurality of updated industry classifications, each industry classification in the updated industry classifications having a vector representation comprising a vector of words;
   one or more processors configured to:
   access the company profile data for a particular company and the member profile data for the employees of the particular company;
   using a featurization process to calculate a classification score, by the one or more processors, for a new industry classification for the particular company from the plurality of updated industry classifications, the classification score derived by comparing the proximity of a vector representation of the particular company with a vector space corresponding with the vector representation of each industry classification in the updated industry classifications, wherein the one or more processors generate the vector representation of the company based on the company profile data for the particular company and the member profile data for the employees of the particular company; and
   update the company profile data for the company profile page of the particular company to include the new industry classification when the calculated classification score for the new industry classification transgresses a predetermined threshold.

2. The system of claim 1, wherein the existing industry classification for use with the company profile page for the company is deleted from the company profile data when the new industry classification is added to the company profile data.

3. The system of claim 1, further comprising a user interface configured to cause presentation, on a display of a device, of the company profile page with the new industry classification.

4. The system of claim 1, wherein the classification score for the new industry classification is calculated by:
   extracting company keywords from the company description in the company page of the company; and
   comparing the company keywords with keywords in the industry taxonomy database associated with the new industry classifications.

5. The system of claim 1, wherein the classification score for the new industry classification is calculated by:
   generating a list of job titles by accumulating the job title in the member profile page of each employee; and
   comparing the list of job titles with job titles in the industry taxonomy database associated with the new industry classifications.

6. The system of claim 1, wherein the classification score for the new industry classification is calculated by:
   selecting a subset of skills from the plurality of skills in the member profile pages of the employees; and
   comparing the subset of skills with skills indicated in the industry taxonomy database for the new industry classifications.

7. The system of claim 1; wherein the member profile page of each employee indicates an employee industry in which the employee is employed, and wherein the classification score for the new industry classification is calculated by:
   generating a list of industries in which employees indicate employment by accumulating the employee industry in the profile page of each employee; and
   comparing the list of industries in which employees indicate employment with the new industry classifications.

8. The system of claim 1, wherein the company profile page includes a list of specialties, and wherein the classification score for the new industry classification is calculated by:
   comparing the list of specialties with specialties identified in the industry taxonomy database for the new industry classifications.

9. The system of claim 1, wherein the classification score for the new industry classification is calculated by:
   accessing a third-party site associated with the company;
   extracting third-party keywords from the third-party site; and
   comparing the third-party keywords with keywords in the industry taxonomy database for the new industry classifications.

10. The system of claim 1, wherein the classification score for the new industry classification is calculated by:
    extracting a keyword from the company profile page of the company; and
    obtaining a keyword affinity score for the keyword and the new industry classification.

11. The system of claim 1, wherein the classification score for the new industry classification is calculated by:
    extracting a keyword from a member profile page of the employees; and
    obtaining a keyword affinity score for the keyword and the new industry classification.

12. The system of claim 1, further comprising a user interface configured to cause presentation, on a display of a device, of an advertisement for the company based on the new industry classification.

13. The system of claim 1, further comprising a user interface configured to:
    receive a search request associated with the new industry classification; and
    cause presentation, on a display of a device, of a search result based on the search request, the search result including the company.

14. A method comprising:

accessing, from a company profile page database, company profile data of a company, the company profile data including an existing industry classification for the company and a company description;

accessing, from a member profile database, member profile data of a plurality of employees of the company, the member profile data indicating a job title of the respective employee and a plurality of skills possessed by the employee as indicated by the employee;

accessing, from an industry taxonomy database, a plurality of updated industry classifications, each industry classification in the updated industry classifications having a vector representation comprising a vector of words;

using a featurization process, calculating, by a processor, a classification score for a new industry classification from the plurality of updated classifications by comparing the proximity of a vector representation of the company with a vector space corresponding with the vector representation of each industry classification in the updated industry classifications, wherein the processor generates the vector representation of the company based on the company profile data for the company and the member profile data for the employees of the company; and updating the company profile data of the company to include the new industry classification when the calculated classification score for the new industry classification transgresses a predetermined threshold.

15. The method of claim 14, further comprising:

deleting the existing industry classification from the company profile data of the company when the calculated classification score for the new industry classification transgresses the predetermined threshold; and causing presentation, on a display of a device, of the company page with the new industry classification.

16. The method of claim 14, further comprising:

extracting company keywords from the company description in the company profile page of the company; and comparing the company keywords with keywords in the industry taxonomy database for the new industry classifications.

17. A non-transitory machine-readable storage medium comprising instructions that, when executed by one or more processors of a machine, cause the machine to perform operations comprising:

accessing, from a company profile page database, company profile data of a company, the company profile data including an existing industry classification and a company description;

accessing, from a member profile database, member profile data of a plurality of employees of the company, the member profile data including for each employee in the plurality of employees, a job title and a plurality of skills;

accessing, from an industry taxonomy database, a plurality of updated industry classifications, each industry classification in the updated industry classifications having a vector representation comprising a vector of words;

calculating, by a processor, a classification score for a new industry classification from the plurality of updated classifications by comparing the proximity of a vector representation of the company with a vector space corresponding with the vector representation of each industry classification in the updated industry classifications, wherein the processor generates the vector representation of the company based on the company profile data for the company and the member profile data for the employees of the company; and update the company page of the company to include the new industry classification when the calculated classification score for the new industry classification transgresses a predetermined threshold.

* * * * *